T. J. RAGAN.
EMERGENCY HORSESHOE ATTACHMENT.
APPLICATION FILED MAY 10, 1911.
1,034,300.
Patented July 30, 1912.
2 SHEETS—SHEET 1.
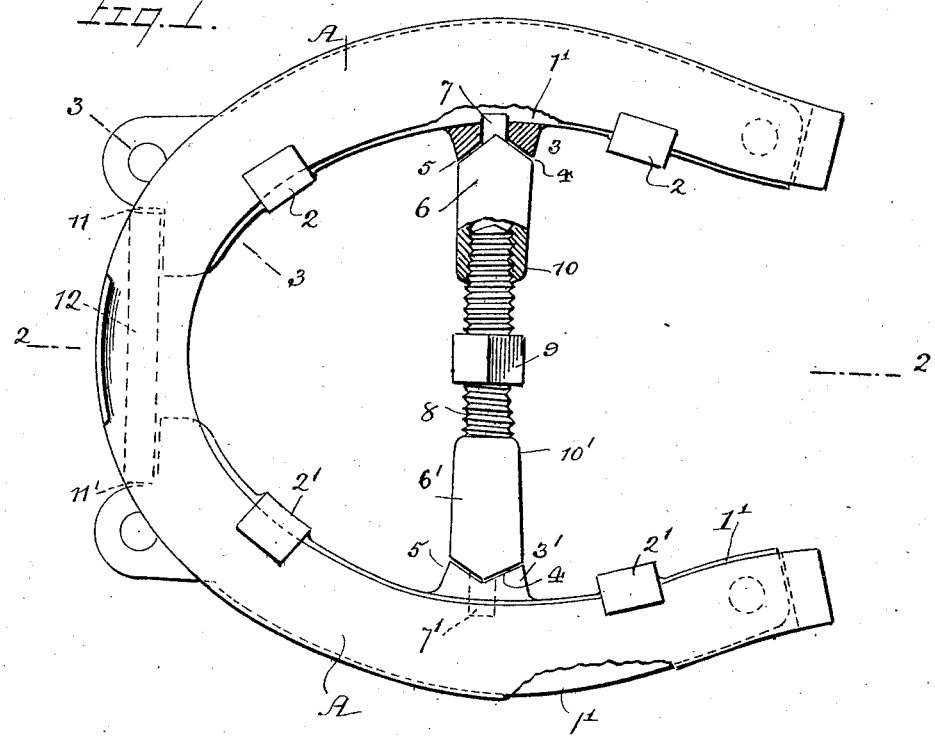
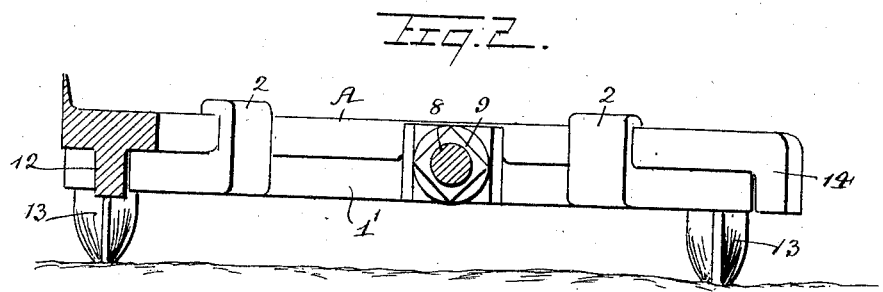
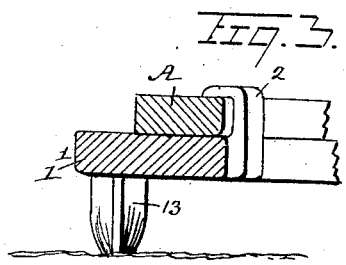
WITNESSES:
S. A. Valentine
INVENTOR
Thomas J. Ragan
BY
F. N. Gilbert
ATTORNEY
COLUMBIA PLANOGRAPH CO., WASHINGTON, D. C.

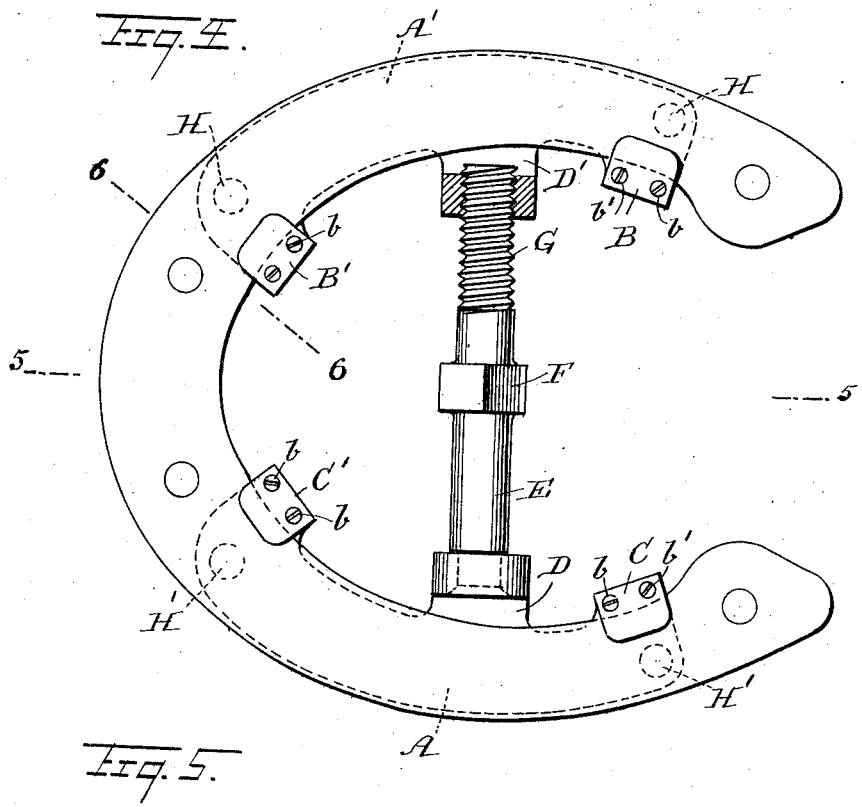
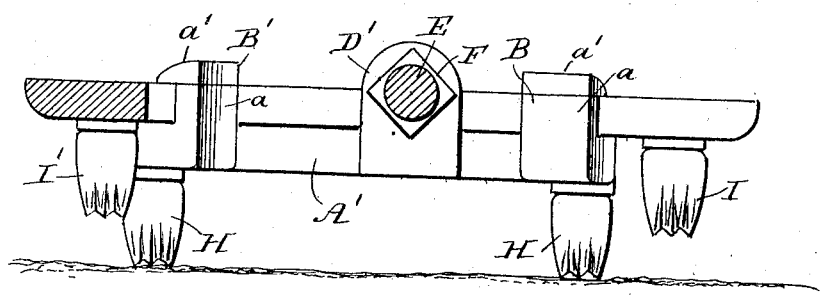
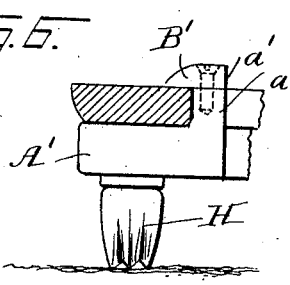

UNITED STATES PATENT OFFICE.

THOMAS J. RAGAN, OF BINGHAMTON, NEW YORK.

EMERGENCY HORSESHOE ATTACHMENT.

1,034,300. Specification of Letters Patent. Patented July 30, 1912.

Application filed May 10, 1911. Serial No. 626,330.

*To all whom it may concern:*

Be it known that I, THOMAS J. RAGAN, a citizen of the United States, residing at Binghamton, in the county of Broome and State of New York, have invented certain new and useful Improvements in Emergency Horseshoe Attachments, of which the following is a specification.

My invention relates to emergency horse shoe attachments and has for its object to enable a set of winter calks to be readily and firmly attached to a horse shoe for winter use without removing the shoe or removing the old calks in the shoe and to hold them in firm engagement with the shoe and to enable them to be readily removed.

With this object in view, my invention consists in certain novel features of construction and arrangement of parts as will be hereinafter fully described and pointed out in the claim, reference being had to the accompanying drawings, in which—

Figure 1 is a top plan view partly in section of a preferred form of my device. Fig. 2 is a longitudinal section on line 2:2 of Fig. 1 and Fig. 3 is a cross section on line 3:3 of Fig. 1. Fig. 4 is a top plan view partly in section of a modified form of my device, Fig. 5 is a longitudinal section on line 5:5 of Fig. 4 and Fig. 6 is a cross section on line 6:6 of Fig. 4 of a modified form of my device.

The same reference characters denote like parts in each of the several figures of the drawings.

In carrying out my invention, in a preferred form of my device, I provide the duplicate members 1 and 1' each having as integral parts of the same, the clamps 2, 2 and 2', 2' formed as hereinafter explained. Projecting from the side of 1 and 1' I have the notched and recessed lug 3 which has in it the recess 4 and the notch 5 and the corresponding notched and recessed lug 3' which has in it the recess 4' and the notch 5'. Into these notches 5 and 5' and the recesses 4 and 4' I insert the wedged shaped screw caps 6 and 6' having the projections 7 and 7'. Between these screw caps I insert the screw bolt 8 having the head 9; the screw bolt 8 having right and left hand threads lapping into the screw caps 6 and 6'. At the outer ends of the members 1 and 1' I have the recesses 11 and 11' the walls of which engage the ends of the toe calk 12. On the members 1 and 1' are mounted in the usual manner the winter calks 13, 13 as shown in Fig. 2.

My device is applied to the horse shoe in the winter season when the calks of the old shoe become worn or broken and it can be readily, quickly and firmly applied in case of emergency or otherwise.

In applying the preferred form of my device to the shoe, I first mount the members 1 and 1' in connection with the shoe. I then mount the screw caps 6 and 6' on the screw bolt 8. I then turn the bolt head 9 until the screw caps 6 and 6' enter the notched opening and recesses 5 and 5' and 4 and 4', as shown in Fig. 1, and by these means the clamps 2, 2 and 2', 2' are forced in firm engagement with the horse shoe A. The upper surface of members 1 and 1' are adapted to conform to and rest upon the under surface of the horse shoe. In order to remove these members from the horse shoe I reverse the movement of the screw bolt 8, which on being turned releases the screw caps 6 and 6' from engagement with the lugs, 3 and 3' of the members 1 and 1' and said members can then be readily removed from the shoe. My device thus is readily applied to the horse shoe without interfering with or removing any of the old calks, 12, 14 as shown in Fig. 2.

In a modified form of my invention, as shown in Figs. 4, 5 and 6, I provide the duplicate members A and A' with the clamps B and B' and C and C', formed of two portions as hereinafter explained. At the base of A I have the projecting lug D in which is loosely mounted the screw bolt E, having upon it the bolt head F and the threaded end G. In the member A' I have the lug D' which engages the threaded end G. On the members A and A' are mounted in the usual manner the winter calks H and H'.

In applying the modified form of my device to the shoe, I turn the bolt head F until A and A' are drawn toward each other, so as to enable them to be inserted within the interior curve of the horse shoe, and the clamps B and B' and C and C' are then ready to engage the interior edges of the shoe. The upper surfaces of A and A' are adapted to conform to and to rest upon the under surface of the horse shoe. I then reverse the movement of the screw bolt E, which on being turned forces the clamps on members A and A' in firm engagement with the shoe, and said members are there firmly held in engagement with the shoe until desired to be removed. My device thus is readily applied to the horse shoe without interfering with or removing any of the old calks, I and I' as shown in Fig. 5. The clamps B and B' and C and C' are formed by the projections made up of the body portion $a$ and the cap $a'$. The cap $a'$ is mounted on the body portion $a$, by means of the screws $b$ and $b'$, or the entire projecting clamp members B and B' and C and C' may be constructed in a solid piece.

Having thus described my invention, what I claim as new and that for which I desire Letters Patent is as follows:

In combination with the shoe having the depending rib upon the under face of the toe portion, and having the depending lugs upon the heels thereof, the pair of members provided with clamps adjacent each end to engage the shoe, having their forward ends notched to fit snug against the depending rib upon the toe of the shoe and forming lugs on said ends, a pair of socketed lugs formed on said members intermediate of the clamps thereon, a pair of screw caps having studs mounted in said socketed lugs, and an adjusting screw engaging the caps for adjusting the members upon the shoe proper.

In testimony whereof I have affixed my signature, in presence of two witnesses.

THOMAS J. RAGAN.

Witnesses:
S. A. VALENTINE,
WALTER T. WEBSTER.

---

Copies of this patent may be obtained for five cents each, by addressing the "Commissioner of Patents, Washington, D. C."